Jan. 5, 1965 W. L. HUSKO ETAL 3,164,394
EXTENSIBLE STEP FOR STATION WAGON AND LIKE VEHICLES
Filed Nov. 19, 1962 3 Sheets-Sheet 1

INVENTORS
Waino L. Husko, &
Louis Pappas
BY
E. E. James
ATTORNEY

Jan. 5, 1965 W. L. HUSKO ETAL 3,164,394
EXTENSIBLE STEP FOR STATION WAGON AND LIKE VEHICLES
Filed Nov. 19, 1962 3 Sheets-Sheet 2

INVENTORS
Waino L. Husko, &
Louis Pappas
BY
E. E. James
ATTORNEY

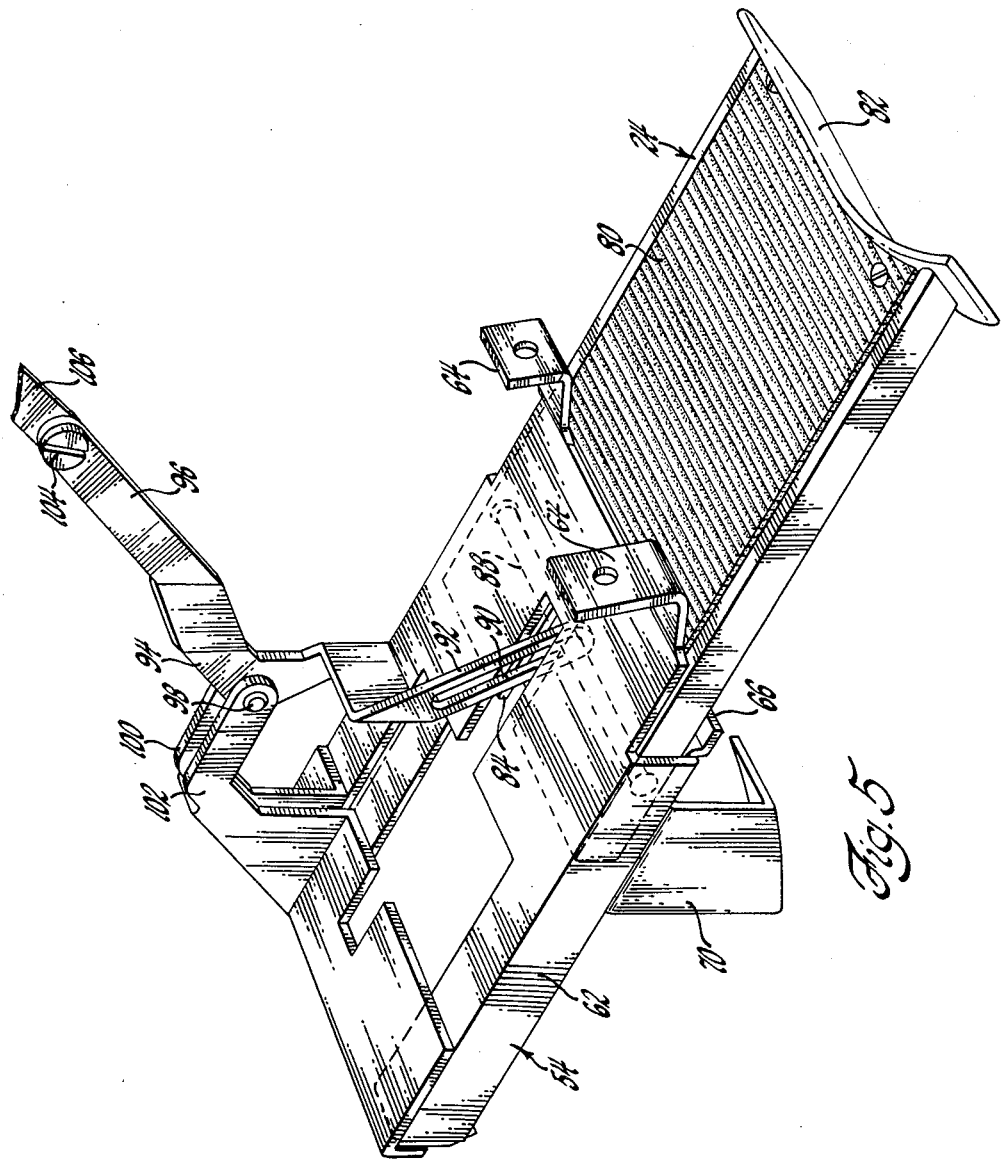

United States Patent Office 3,164,394
Patented Jan. 5, 1965

3,164,394
EXTENSIBLE STEP FOR STATION WAGON AND LIKE VEHICLES
Waino L. Husko, Detroit, and Louis Pappas, Warren, Mich., assignors to General Motors Corporation, Detroit, Mich., a corporation of Delaware
Filed Nov. 19, 1962, Ser. No. 238,500
8 Claims. (Cl. 280—166)

This invention relates to a step for a motor vehicle and particularly contemplates a relatively simple step normally retracted and operably connected and extensible to facilitate access and entry to the interior compartment of a station wagon or like motor vehicle upon movement of a vehicle body closure member to an opened position.

For illustrative purposes, the invention is herein shown and described with reference to a station wagon having a rearwardly facing third seat accessible for passenger entry through a rear body opening closeable, at least in part, by a tailgate or door member pivotally hinged for swinging movement about a horizontal axis between a vertically inclined closed position and a substantially horizontal opened position. The illustrative embodiment features a step which is slidably extensible for the purpose indicated from a rear bumper supporting track defining member through an opening provided in the rear bumper and operably connected through a lost motion bell crank lever and a tie link to an adjacent closure pivoting hinge member for actuation therewith between retracted and extended step positions corresponding to movement of the tailgate member between its closed and opened positions.

The foregoing and other objects, advantages and features of the invention will be apparent from the following description of the illustrative embodiment having reference to the accompanying drawings, in which:

FIGURE 5 is a detailed view of the bumper supporting members and the extensible step, in accordance with the invention.

Figure 1:
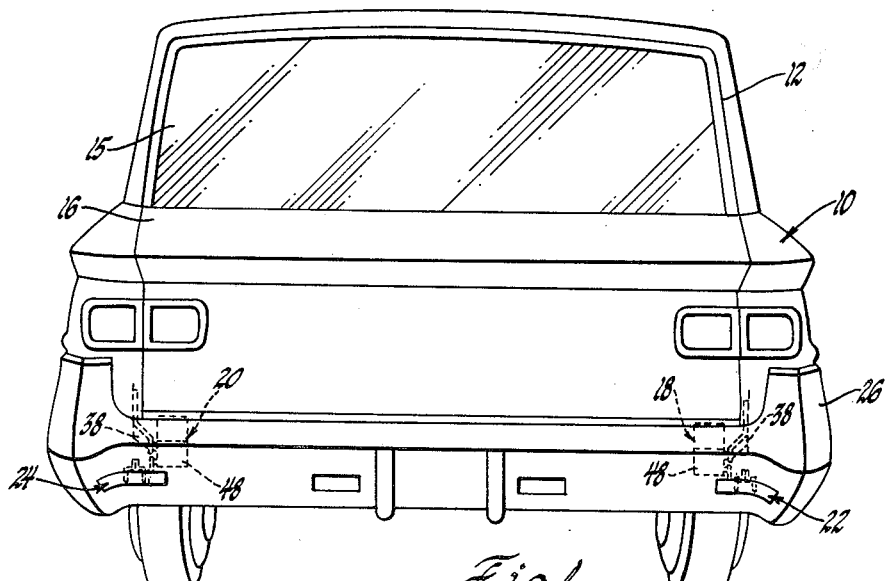
FIGURE 1 is a rear elevational view of a station wagon automotive vehicle incorporating hinge operated extensible steps illustrative of the invention.

Referring more particularly to FIGURE 1, the rear body portion of an automotive station wagon vehicle is indicated generally by the reference numeral 10. A rear door opening outlined at 12 provides access to an interior compartment 13 which may include a rearwardly facing third passenger seat, not shown, foldable in a conventional manner to provide a substantially flat cargo deck coextensible with a threshold defining panel member 14. The upper portion of the door opening 12 is closeable by a window 15 retractably mounted in a tailgate 16 adapted to close the lower portion of the door opening 12. The bottom of tailgate 16 is pivotally supported by laterally spaced hinge mechanisms 18 and 20 for swinging movement about a substantially horizontal axis between a retracted vertically inclined body closing position and a substantially horizontal opened position. As indicated above, the hinges 18 and 20 are operatively connected to steps 22 and 24 which are slidably extensible through openings provided in a rear bumper 26 mounted transversely of the vehicle immediately below the door opening 12. The hinges 18 and 20 and their associated extensible steps 22 and 24 are similar but of reverse or opposite hand to hinge laterally opposite sides of the tailgate member. The following description of the left hand hinge mechanism 20 and its associated extensible step 24 accordingly applies as well to the right hand hinge 18 and its extensible step 22.

Figure 2:
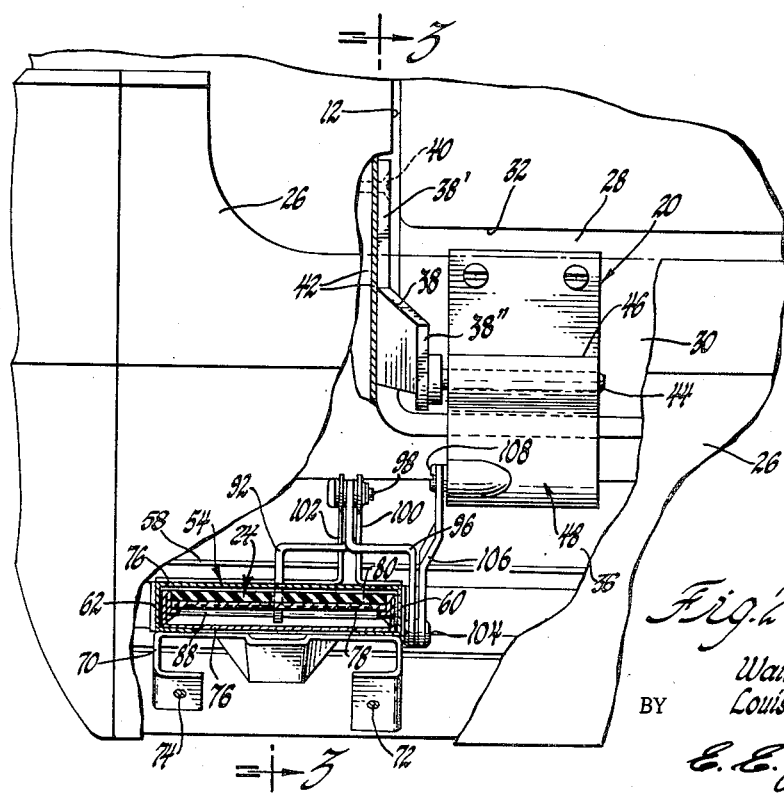
FIGURE 2 is an enlarged fragmentary view of a portion of FIGURE 1 partially broken away and sectioned to show certain mounting details of the extensible step and its operative driving connection with the closure mounting hinge member.
Figure 3:
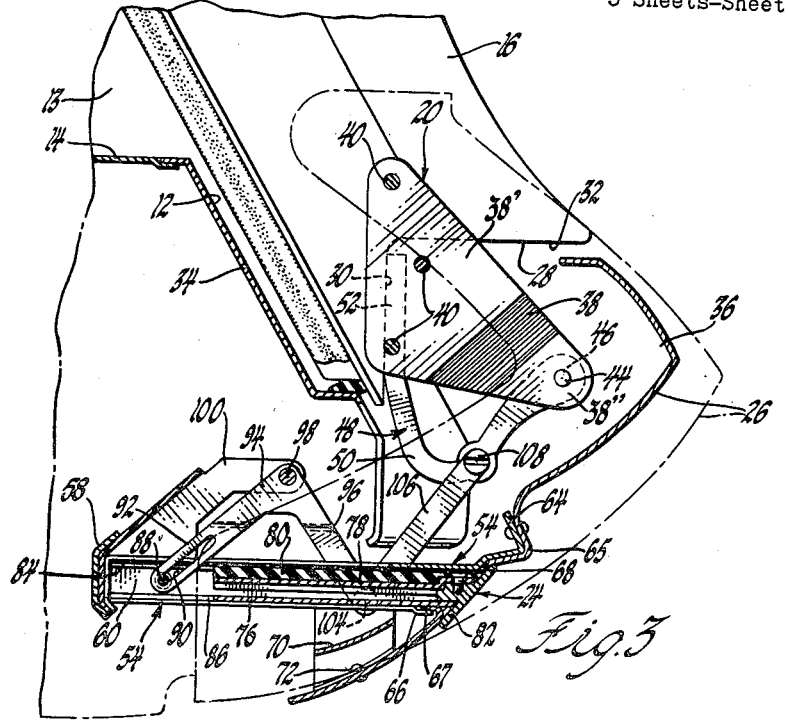
FIGURE 3 is a sectional view taken substantially in the direction of the arrows and in the plane of the line indicated at 3—3 of FIGURE 2 and shows the tailgate and the several hinge operated elements in their tailgate closed, step retracted positions.
Figure 4:
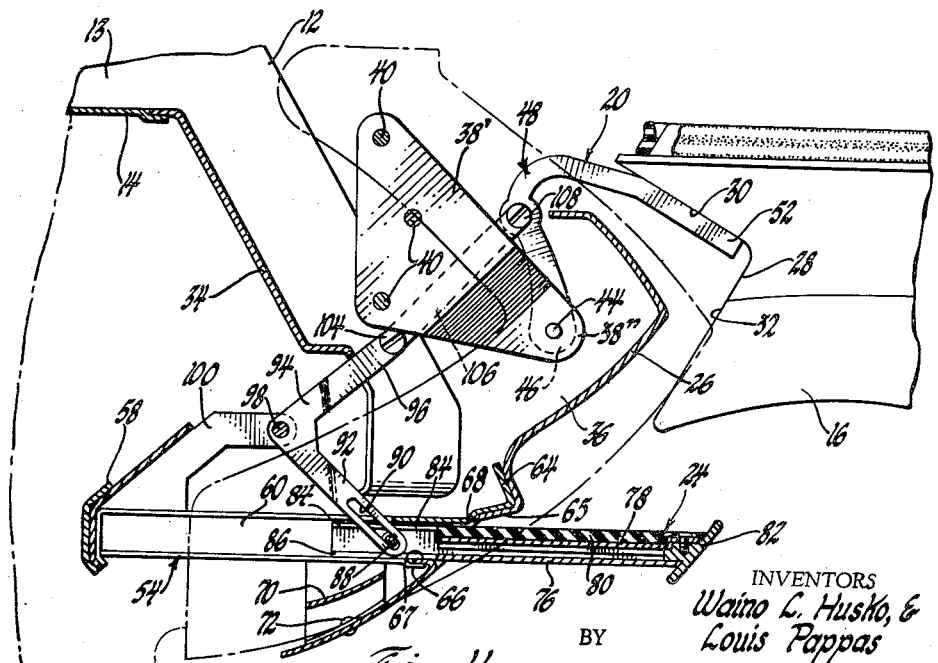
FIGURE 4 is a sectional view similar to FIGURE 3, but showing the several elements in their tailgate-opened, step extending positions.

As shown in detail in FIGURES 2–4, the bottom of the tailgate 16 has a notch 28 defined by intersecting walls or surfaces 30 and 32 extending transversely of the vehicle. When the tailgate is in its closed position, these transverse notch defining surfaces cooperate with the rear bumper and its adjacent upper edge and a door sill defining body panel member 34 to define a hinge housing compartment 36 extending transversely of the vehicle. The tailgate mounting hinge 20 includes a triangular hinge supporting plate or bracket member 38. A base plate portion 38' of this hinge bracket member is suitably secured as shown at 40 to a door jamb pillar member 42 defining the left side of the vehicle body door opening 12. The tip 38'' of the hinge supporting bracket member remote from its mounting base portion projects rearwardly of the vehicle and slightly downwardly into the bumper defined hinge housing compartment 36. In the illustrative embodiment, the tip of the bracket member 38 is offset from its mounting base portion laterally inwardly of the door opening 12 and mounts a hinge pin 44 extending horizontally and transversely of the vehicle in alignment with a corresponding bracket supported hinge pin of the right hand hinge 18.

The hinge pin 44 pivotally mounts one end 46 of a hinge strap member 48 of U-shaped gooseneck configuration. The pivotal end of this hinge member is connected by a bight portion 50 to a strap end portion 52 suitably secured to the transverse wall 30 of the adjacent undercorner of the tailgate 16. The hinge member 48 is thus mounted to carry the tailgate between its vertically inclined closed position, in sealing engagement with the door opening defining body members as shown in FIGURE 3, and a substantially horizontal opened position, spaced rearwardly of the bumper 26 and coextending the cargo deck of the vehicle compartment as shown in FIGURE 4. The tailgate 16 may be counterbalanced by appropriate conventional means, not shown, to minimize the effort required for movement between its closed and opened position.

A step mounting member 54 is secured at one end to a transverse vehicle body member 58. This member extends rearwardly from its body mounted end and defines two laterally spaced opposed channel tracks 60 and 62. These opposed tracks slidably mount the extensible step 24. The end of the member 54 remote from its body supported end is flanged at 64 and 66. These flanges are secured to mating pilot portions 65 and 67 formed on the bumper 26 to thereby align the opposed channel tracks 60 and 62 of the member 54 with the step receiving opening 68 through the bumper. The opposed channel tracks of the member 54 are also supported intermediate their ends by a transverse bracket 70 having depending flanged legs spacedly secured to the lower portion of the bumper at 72 and 74. The step mounting member 54 thus, at least partially, supports the adjacent end of the bumper 26.

The extensible step 24 comprises a primary step member 76 of substantially rectangular hollow cross section depressed at 78 to form a recess mounting a tread 80 of suitable material. The end of the step member 76 outwardly extensible from the bumper is obliquely cut and mounts an end member 82 flanged obliquely to close the bumper opening 68 when the step is in its normally retracted position. The track supported inner end of the step member 76 is bisected by vertical slots indicated at 84 and 86 and carries a pivot pin 88 extending transversely between its opposing side walls. The pin 88 is slidable in a slot 90 formed in a laterally offset arm portion 92 of a bell crank lever 94 to provide a loss motion driving connection therebetween. The bell crank lever 94 is pivotally supported at 98 intermediate laterally and oppositely offset arm portions 92 and 96 by a pin extending between bracket members 100 and 102 vertically interposed between and suitably secured to the transverse body member 58 and the upper wall portion of the step mounting member 54. The other offset arm 96 of the bell crank lever 94 is pivotally connected at 104 to one end of a link 106. The opposite end of the link 106 is pivotally connected at 108 to the bight portion 50 of the swinging hinge member 48.

The link 106, the bell crank lever 94 and its pin-and-slot driving connection with the step mounted pin 88 thus cooperate to provide a driving connection between the swinging hinge member 48 and the extensible step 24 operable to actuate the step from its retracted position shown in FIGURE 3 to its extended position shown in FIGURE 4 upon opening swinging movement of the tailgate member toward its horizontal opened position. Movement of the tailgate member from its opened toward its closed position similarly retracts the step 24 into the bumper and its mounting member.

From the foregoing description, it will be seen that the illustrative embodiment of the invention provides a relatively simple closure operated extensible step adapted to facilitate access and entry to the rear compartment of a vehicle of the type indicated. It will be further apparent that various changes, modifications and departures might be made in and from the illustrative embodiment without departing from the spirit and scope of the invention as defined in the following claims.

We claim:

1. In an automotive vehicle including a closed station wagon body defining a combined passenger and load compartment and having a rear access door opening to a foldable rearwardly facing seat,
 a closure member hinged for swinging movement about a substantially horizontal axis between a retracted vertically inclined position closing said rear access door opening and an extended substantially horizontal opened position permitting passenger access therethrough,
 a rear bumper member mountable transversely of the vehicle in spaced relation to the lower edge of the rear access door opening,
 means for mounting the bumper member is spaced relation to the lower edge of the rear access door opening and spaced laterally outwardly therefrom, said laterally spaced bumper mounting means including at least one step mounting guide member extending between said body and bumper member,
 an extensible step mounted by said guide member for movement between a retracted position and a horizontally extended position providing a step facilitating passenger entry through the rear access door opening to the rearwardly facing seat,
 and motion translating means operably interconnecting said step and closure member and operable to actuate said extensible step between its retracted and extended positions in accordance with the hinged swinging movement of the closure member between its retracted body closing position and its extended opened position.

2. In a motor vehicle including a closed body having a rear access opening therein,
 a closure member mountable for swinging movement between a retracted vertically inclined position closing the rear body opening and an extended substantially horizontal opened position permitting access through the rear opening,
 a bumper member supported transversely of the vehicle in spaced juxtaposition below the access opening and cooperating with the vehicle body and the closure member when in its closed position to define a transverse hinge housing chamber,
 a pair of hinge brackets mounted on the vehicle body adjacent the lower corners of the rear access opening and projecting rearwardly into said bumper defined hinge housing chamber,
 a pair of swinging hinge members having strap portions secured to laterally opposite undercorners of the closure member and gooseneck bight portions pivotally mounted by said bracket members at their ends distal from the closure member for swinging movement of the closure member about a substantially horizontal axis,
 said bumper having a pair of openings therein laterally outwardly of the closure member and its supporting hinge members,
 means mounting said bumper in said spaced relation to the vehicle body and including laterally spaced support members defining opposed channel tracks alignable with the openings in said bumper,
 an extensible step slidably mounted in the opposed channel tracks of each of said bumper supporting members for reciprocable movement between a retracted position within the bumper and a horizontally extended position providing a step to facilitate access through the rear opening into the vehicle body,
 and means operably interconnecting each of said extensible steps with the adjacent swinging hinge member to actuate said steps between their retracted and extended positions in accordance with swinging movement of the closure member between its retracted body closing position and its extended opened position.

3. In a motor vehicle including the combination set forth in claim 2, said interconnecting means each including
 a bell crank lever pivotally mounted for swinging movement about an axis spaced and parallel to the pivotal axis of said hinge members,
 a link pivotally connected at one end to the adjacent swinging hinge member and pivotally connected at its opposite end to one arm of the adjacent bell crank lever,
 and the other arm of each adjacent bell crank lever having a lost motion driving connection with the inner end of the extensible step.

4. In a motor vehicle including a closed station wagon body having a rear access door opening to a rearwardly facing passenger seat,
 a closure member hinged for swinging movement about a substantially horizontal axis between a retracted vertically inclined position closing said rear access door opening and an extended substantially horizontal opened position permitting passenger access therethrough,
 a rear bumper member supported transversely of the vehicle in spaced juxtaposition below the rear access door opening and having an opening therethrough spaced laterally outwardly of the door opening,
 a bumper supporting and step mounting guide member concealed by said bumper member and extending between the body and the bumper member in alignment with the opening therethrough,
 a step member mounted by said guide member for movement between a retracted position closing the bumper opening and a horizontally extended position projecting outwardly of the bumper opening to provide a step facilitating passenger access to the rearwardly facing passenger seat,
 and bumper concealed motion translating means interconnecting said step and closure member including
 a bell crank lever pivotally mounted adjacent said step supporting guide member for swinging movement about an axis spaced and parallel to the pivotal hinge axis of said closure member, and a link pivotally connected at one end for swinging movement with the closure member and pivotally connected at its opposite end to one arm of the adjacent bell crank lever, the other arm of the bell crank lever having a pin-and-slot lost motion driving connection with the adjacent extensible step operable to translate closure effected swinging movement of the bell crank lever to corresponding retracting and extending movement of the step.

5. In a motor vehicle having a door opening therein, a closure member mounted on the vehicle for movement between opened and closed positions relative to the door opening, a bumper member mountable on the vehicle in closely spaced relation to the lower edge of the door opening and having an opening therethrough spaced below the door opening, means for mounting the bumper member on the vehicle in spaced relation to the lower edge of the door opening and including a bumper supporting member and defining a substantially horizontal guide track aligned with the bumper opening and extending between the vehicle and bumper member, a step mounted by said guide track for slidable movement between a retracted position housed substantially within the bumper and the bumper supporting guide track member, and an extended position facilitating access through the door opening, and motion translating means connecting the step to the closure member and operable to actuate the step between its retracted and extended positions according to movement of the closure member between its closed and opened positions.

6. In the combination of claim 5, said motion translating means including a bell crank lever pivotally mounted about an axis extending transversely and in spaced parallel relation to the plane of movement of the step, one arm of the bell crank lever having a lost motion driving connection with the step, and the other arm of said bell crank lever being operably connected for movement with the closure member.

7. In the combination of claim 6, said closure member being hinged to the vehicle for swinging movement about a substantially horizontal axis between a vertically disposed closed position and a substantially horizontal opened position, and a tie link pivotally connected at one end to said other arm of the bell crank lever and pivotally connected at its opposite end to the closure member for swinging movement therewith.

8. In a motor vehicle including a body having a door opening in one end thereof, a closure member hinged on the body for swinging movement about a substantially horizontal axis between a substantially horizontal opened position and a retracted vertically inclined position closing the door opening, a bumper member mountable transversely of the vehicle in spaced relation to the lower portion of the door opening and having an opening therethrough spaced laterally outwardly of the door opening, means for mounting the bumper member in such spaced relation to the vehicle body including a bumper supporting guide member aligned with the bumper opening and extending between the body and bumper member, a step slidably mounted by the bumper supporting guide member for movement between a retracted position housed between the body and bumper member and a horizontally extended position projecting outwardly of the bumper member to facilitate access through the door opening, and motion translating means connecting the extensible step with the hinged closure member and operable to actuate the step between its retracted and extended positions in accordance with hinged swinging movement of the closure member between its retracted closing position and its extended opened position.

References Cited in the file of this patent
UNITED STATES PATENTS

| | | |
|---|---|---|
| 1,072,325 | Gardner | Sept. 2, 1913 |
| 1,471,972 | Miller | Oct. 23, 1923 |
| 2,888,296 | Huggins | May 26, 1959 |
| 2,948,550 | Brown | Aug. 9, 1960 |
| 3,064,846 | Thomas | Nov. 20, 1962 |